United States Patent [19]
Meyers

[11] 3,958,366
[45] May 25, 1976

[54] FLOWER POT

[76] Inventor: Robert E. Meyers, 182 Kirby Ave., Lackawanna, N.Y. 14218

[22] Filed: Sept. 3, 1974

[21] Appl. No.: 502,966

[52] U.S. Cl. ............................................. 47/38.1
[51] Int. Cl.² ..................................... A01G 27/00
[58] Field of Search ............... 47/34, 34.1, 38, 38.1; 220/293

[56] References Cited
UNITED STATES PATENTS

| | | | |
|---|---|---|---|
| 153,715 | 8/1874 | Landers | 47/34.2 |
| 1,216,642 | 2/1917 | White | 47/38.1 |
| 1,641,528 | 9/1927 | Brewster | 220/293 |
| 1,707,551 | 4/1929 | Hale | 47/38 |
| 1,948,031 | 2/1934 | Guille | 47/38 |
| 2,344,202 | 3/1944 | Carlson | 47/38.1 |
| 3,381,410 | 5/1968 | Potain | 47/38 |

FOREIGN PATENTS OR APPLICATIONS

| | | | |
|---|---|---|---|
| 2,331,181 | 1/1960 | Australia | 47/38.1 |
| 579,120 | 10/1924 | France | 47/38.1 |
| 1,134,981 | 4/1957 | France | 47/38.1 |
| 80,172 | 7/1894 | Germany | 47/38 |
| 121,113 | 8/1900 | Germany | 47/38 |
| 564,544 | 11/1932 | Germany | 47/38.1 |
| 1,956,124 | 6/1971 | Germany | 47/38.1 |
| 95,840 | 3/1939 | Sweden | 47/38.1 |
| 11,461 | 7/1891 | United Kingdom | 47/38 |
| 403,460 | 12/1933 | United Kingdom | 47/38.1 |

Primary Examiner—Edgar S. Burr
Assistant Examiner—Steven A. Bratlie
Attorney, Agent, or Firm—Roger A. Clapp

[57] ABSTRACT

A flower pot specifically designed for the successful growth of indoor plants including a bottom container for holding water and an upper container resting on the bottom container for holding potting soil and the plants, there being a plurality of cylindrical aeration tubes extending inwardly of the upper container through the side walls and having perforated tube side walls for placing the soil in communication with the surrounding atmosphere to prevent mold, and with there being a plurality of cylindrical tubes extending between the upper and bottom containers with each of a hollow configuration and each having a fibrous wick extending therethrough of a length such that one end is in contact with the water in the bottom container and with the opposite end extending through the potting soil adjacent the plant roots to carry water continuously from the bottom container to the potting soil about the plant roots by means of capillary flow.

5 Claims, 4 Drawing Figures

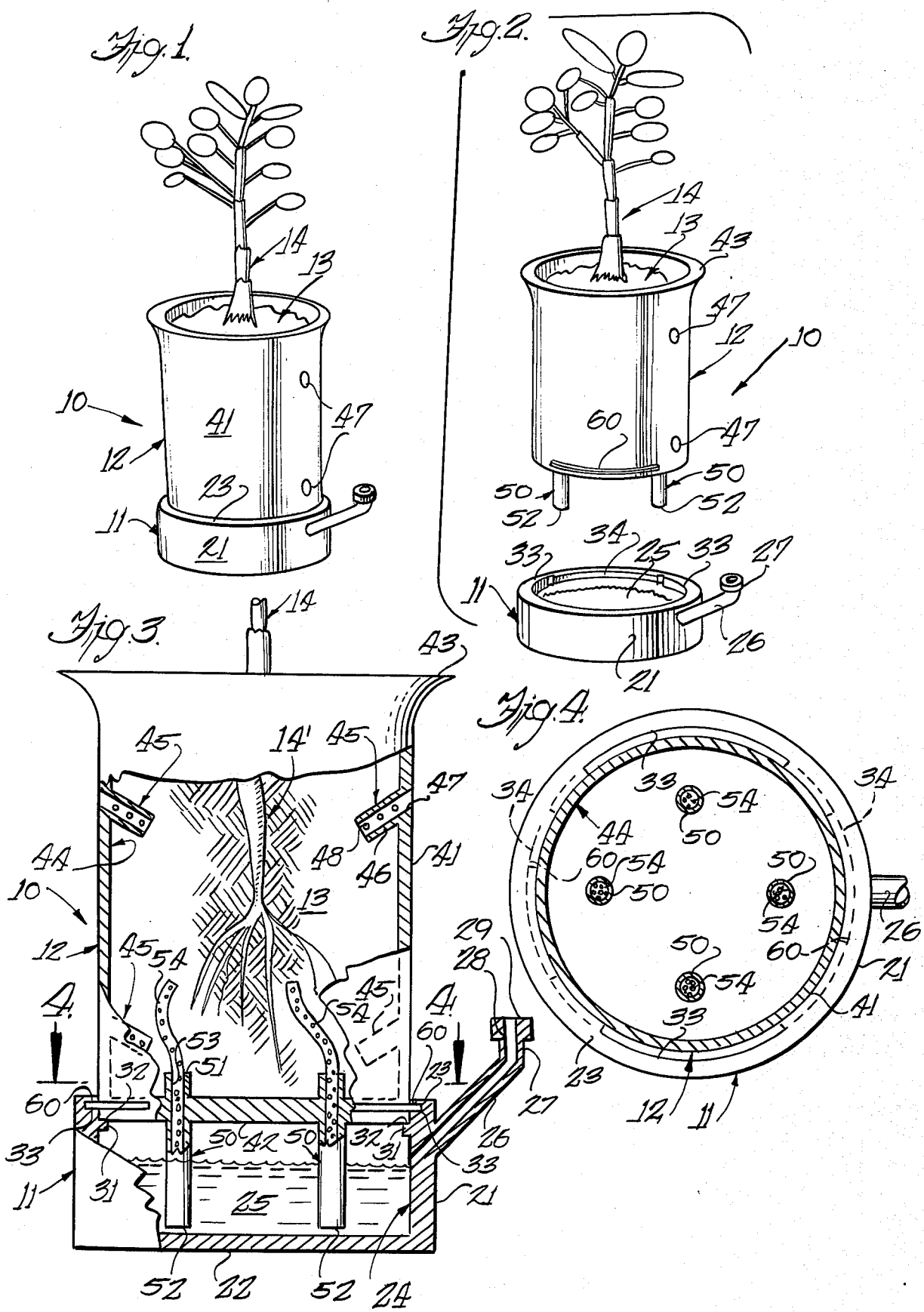

FLOWER POT

BACKGROUND OF THE INVENTION

1. Field of the Invention

This invention relates generally to planters and more particularly to a novel and improved flower pot including means to regulate the moisture content of the soil to provide optimum moisture for plant growth and also having means to assure adequate aeration of the soil.

2. Description of the Prior Art

It is generally known that there is an optimum moisture environment for plant roots when grown indoors, with the growth of the plant being adversely affected if there is either considerably greater moisture or considerably less moisture than the optimum. Too little water in the soil stunts the growth because water is needed for the plant growth, while too much water in the soil stunts the growth of the plant by reducing the amount of air in the soil.

Further, the combination of the amount of water in the soil and the amount of air in the soil acts together in the forming or preventing of root rotting and mold growth in the soil. Root rotting is caused by a saturated soil condition, while mold growth is caused by a lack of sufficient air content of the soil.

Prior art devices have attempted to provide a balanced water situation for the plant, such devices being generally illustrated by U.S. Pat. Nos. 3,534,498; 3,261,125; 2,810,235; and 3,220,144. However, all of these devices have failed to meet with popular consumer acceptance due to one or more problems, such as being overly expensive to produce and thus expensive to purchase, require a high level of maintenance, are difficult to maintain filled with water, and are otherwise generally unacceptable. Further, these devices make no attempt to provide suitable aeration to the soil but merely direct themselves to the problem of providing water to the soil, such that mold growth is not discouraged by these devices.

SUMMARY OF THE INVENTION

The present invention recognizes the deficiencies and disadvantages of presently available flower pots, and recognizing the need for maintaining potting soil of indoor plants with a correct aeration and moisture content, provides a novel flower pot including wick means to provide the proper soil moisture by capillary action from a water reservoir, and aeration tubes to assist in the proper aeration of the soil.

It is a feature of the present invention to provide a novel flower pot consisting of a bottom container for holding water and an upper container separable from the bottom container for the holding of potting soil and the plant, the upper container resting on the bottom container and having wicks interconnecting the interiors of the containers to provide moisture to the potting soil about the root area by capillary action, the upper container including aeration tubes extending into the potting soil to communicate the interior of the soil with the surrounding atmosphere for aeration thereof.

A further feature of the present invention provides a flower pot which is relatively simple in its construction and which therefore may be readily manufactured at a relatively low cost and by simple manufacturing methods of readily available materials such that it can be retailed at a sufficiently low price to encourage widespread use thereof.

Yet still a further feature of the pesent invention provides a flower pot which is possessed of few parts and which therefore is unlikely to get out of order; and one which is easy to use and reliable and efficient in operation.

Yet still a further feature of the present invention provides a flower pot having self-watering and aeration properties permitting sufficient water to be placed therein to cover an extended interval of time during which individuals may be away on vacation and the like while being assured that the plant is sufficiently watered during their absence.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the flower pot of the present invention;

FIG. 2 is an exploded perspective view of the flower pot showing the upper and bottom containers thereof;

FIG. 3 is an enlarged front elevational view of the flower pot partially broken away to illustrate interior details thereof; and FIG. 4 is a cross-sectional view taken along Line 4—4 of FIG. 3.

DESCRIPTION OF THE PREFERRED EMBODIMENT

Referring now to the drawings in detail there is illustrated a preferred form of a flower pot constructed in accordance with the principles of the present invention and which is designated generally in its entirety by the reference numeral 10 and which is comprised generally of two component parts, namely a bottom container 11 adapted for holding water therein, and an upper container 12 adapted for the holding of potting soil 13 and a plant 14 therein. The flower pot 10 may be manufactured out of metal, wood, hard rubber, plastic, or any other suitable satisfactory material, with the preferred embodiment being manufactured of a polystyrene or polyethylene plastic material which may be provided in a variety of decorative colors and designs appealing to prospective purchasers.

The bottom container 11 is of an open topped cylindrical configuration having cylindrical side walls 21, a closed bottom end 22, and a surrounding top rim 23 which extends about the mouth end of the bottom container and provides access to the water containing compartment 24 therein adapted to hold a quantity of water 25. Extending outwardly in an upper inclined direction from side wall 21 is tubular filling spout 26 terminating at its outer end portion contiguous with a vertical segment 27 and with there being a passageway 28 extending completely therethrough between open top end 29 and the compartment 24 for use in pouring water therethrough to fill the compartment 24.

An annular flange 31 is disposed about the interior side walls of compartment 24 inwardly of rim 23 and defines annular shoulder 32. A pair of diametrically spaced apart vertically extending notches 33 are disposed in the interior side walls of rim 23 and extend downwardly to shoulder 32 and extend circumferally about the rim for an arcuate segment thereof. Disposed intermediate rim 23 and shoulder 32 and extending circumferally between the vertical notches 33 is an annular groove 34 which is in communication at the ends thereof with the notches 33.

The upper container 12 is of a cylindrical configuration having side walls 41, a closed bottom end 42, a lip defining mouth rim 43, an interior plant and potting soil retaining compartment 44, a plurality of circumferally spaced apart radially inwardly and downwardly projecting aeration tubes 45 affixed to the side walls 41 and having tubular side walls 46 defining a passageway 47 extending therebetween to place the interior portions of potting soil 13 in communication with the surrounding atmosphere. Further, the side walls 46 of aeration tubes 45 are provided with perforations 48 to increase the efficiency of aeration of the soil. Extending vertically through horizontal bottom end 42 are a plurality of spaced apart cylindrical wick tubes 50 each of an identical cylindrical configuration having an open top end 51 and an open bottom end 52 defining an interior passageway 53 extending completely therethrough, the top end 51 being disposed inwardly of compartment 44 with the bottom end 52 projecting exteriorly of upper container bottom end 42 in a position to project into compartment 24 of bottom container 11 when the upper container is rested thereon as will be later described. Extending through each passageway 53 is a wick 54 manufactured of fibrous material, such as cotton rope, the wicks extending upwardly through the soil 13 to be disposed adjacent the roots 14′ of the plant 14.

Disposed adjacent bottom end 42 and extending from diametrically opposed positions on side walls 41 radially outwardly therefrom are tongue members 60 each having an arcuate circumferal peripheral edge with the dimensions of the tongue member being slightly less than the openings of the notches 33 so as to be engaged in the same when the periphery of bottom end 42 of upper container 12 rests on the shoulder portion 32. Rotation of the upper container 12 about its axis in either direction will then effect the engagement of tongue members 60 into the slots or grooves 34 to detachably retain the upper container 12 to the bottom container 11.

There is thus provided a novel flower pot structure which prevents and inhibits root rotting and mold growth in the soil, it being remembered that root rotting is caused by an oversaturated soil condition while mold growth is caused by lack of proper aeration of the soil. The wicks 54 in tubes 50 carry water 25 from bottom container 11 to the soil 13 through capillary action to provide just the amount of water needed about the roots 14′ of the plant thus encouraging root growth rather than root rotting. The aeration tubes 45 projecting inwardly of the soil in both the top and bottom portions of the uppper container 12 provides passageways for air from the surrounding atmosphere to mingle with the interior portions of the potting soil to prevent mold growth and to provide more than adequate aeration of the soil in the flower pot.

The lower container 11 may be of a sufficient size such that a large volume of water 25 may be inserted thereinto, such as when an individual is going on a lengthy vacation and will not be available to water the plant frequently, with the plant being properly watered continuously during the individual's absence as water is continuously fed into the central interior of the upper container 12 by means of capillary flow from the water in compartment 24 of bottom container 11, the water flowing up the wicks 54 into the soil 13.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. In apparatus for accommodating plants, the combination comprising:

a unitary reservoir container comprising an enclosing wall, a seat and a fill tube, said enclosing wall having a substantially cylindrical configuration open at one end to form a mouth and having a unitary floor at the other end to define a fluid compartment, said seat being a projection extending inwardly from said enclosing wall to form a ledge in said reservoir container and said fill tube projecting outwardly from said enclosing wall so as to communicate with said fluid compartment by a passage formed in said fill tube whereby liquid may flow through said passage to fill said fluid compartment;

a planting container comprising an enclosing wall, a plurality of hollow aerator tubes and a plurality of hollow wick tubes combined in a unitary assembly wherein said enclosing wall has a substantially cylindrical configuration and has a floor at one end to define a planting compartment which rests on said ledge when said planting and reservoir containers are joined, said hollow aeration tubes being disposed at spaced apart locations in the enclosing wall of said planting container and extending from the atmosphere surrounding the planting container through and beyond said enclosing wall into said planting compartment whereby said surrounding atmosphere can readily communicate with soil material placed in said planting compartment so as to achieve widely dispersed internal aeration thereof, said hollow wick tubes being symetrically formed in said planting container floor with inner ends projecting into said planting compartment and outer ends projecting beyond said planting container floor;

a wick disposed in each of said wick tubes and extending beyond the inner and outer ends thereof, and holding means for detachably joining said planting container to said reservoir container with said wick tubes projecting into said fluid compartment whereby fluid therein can be transported into said planting compartment by said wicks.

2. The combination in accordance with claim 1 wherein said hollow aerator tubes are inclined toward said floor of said planting container.

3. The combination in accordance with claim 2 wherein each of said hollow aerator tubes is perforated by a plurality of aperatures whereby disbursement of air into said planting chamber is facilitated.

4. The combination in accordance with claim 3 wherein said holding means comprises a groove, a notch, and tongue means for engaging said groove, said groove extending annularly around the interior of the mouth of said reservoir container, said notch forming an upwardly directed opening in a portion of said groove to receive said tongue means and said tongue means projecting outwardly from the enclosing wall of said planting container and having exterior dimensions to allow passage through said opening to be in registration with said groove when said planting container is resting on said ledge in said reservoir container whereby relative rotational movement between said planting and reservoir containers will affect sliding of said tongue means from said opening into said groove to detachably lock together said planting and reservoir containers.

5. The combination in accordance with claim 4 wherein said tongue means comprises an annular lip extending partially around the enclosing wall of said planting container.

* * * * *